(12) United States Patent
Scholz

(10) Patent No.: US 9,765,636 B2
(45) Date of Patent: Sep. 19, 2017

(54) FLOW RATE RESPONSIVE TURBINE BLADES AND RELATED METHODS

(71) Applicant: BAKER HUGHES INCORPORATED, Houston, TX (US)

(72) Inventor: Eckard Scholz, Eldingen (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 577 days.

(21) Appl. No.: 14/197,681

(22) Filed: Mar. 5, 2014

(65) Prior Publication Data

US 2015/0252677 A1 Sep. 10, 2015

(51) Int. Cl.
  *F01D 5/30* (2006.01)
  *F03B 13/02* (2006.01)
  *E21B 41/00* (2006.01)
  *F01D 7/02* (2006.01)

(52) U.S. Cl.
  CPC ............ *F01D 5/30* (2013.01); *E21B 41/0085* (2013.01); *F03B 13/02* (2013.01); *F01D 7/02* (2013.01); *F05B 2240/311* (2013.01); *Y10T 29/49337* (2015.01)

(58) Field of Classification Search
  CPC ..... F01D 5/30; F01D 7/02; E21B 4/02; B64C 27/51; B64C 27/33; F03D 7/0224; F03D 7/041; F05B 2260/77; F05B 2240/31
  USPC ............ 415/4.1, 4.2, 4.3; 416/140, 240, 243
  See application file for complete search history.

(56) References Cited

U.S. PATENT DOCUMENTS

| | | | |
|---|---|---|---|
| 3,913,329 A | 10/1975 | Priluck | |
| 3,967,680 A | 7/1976 | Jeter | |
| 4,004,861 A * | 1/1977 | Soules | F03D 3/067 416/119 |
| 4,776,752 A | 10/1988 | Davis | |
| 4,900,227 A | 2/1990 | Trouplin | |
| 5,551,510 A | 9/1996 | Mills | |
| 5,584,656 A | 12/1996 | Rose | |
| 5,851,131 A * | 12/1998 | Bergeron | B63H 3/008 416/140 |
| 6,041,514 A | 3/2000 | Herzog | |
| 6,267,185 B1 | 7/2001 | Mougel et al. | |
| 6,688,842 B2 * | 2/2004 | Boatner | F03D 3/067 415/4.2 |
| 6,763,899 B1 | 7/2004 | Ossia et al. | |
| 6,854,953 B2 | 2/2005 | Van Drentham-Susman et al. | |

(Continued)

FOREIGN PATENT DOCUMENTS

| EP | 2322793 A1 | 5/2011 |
|---|---|---|
| WO | 2011003009 A2 | 1/2011 |

OTHER PUBLICATIONS

Cohen, D. J. et al.,"Development of a Gas Handling Hydraulic Submersible Pump and Planning a Field Trial", Captain Field.

(Continued)

*Primary Examiner* — Matthew W Jellett
(74) *Attorney, Agent, or Firm* — Mossman, Kumar & Tyler, PC

(57) ABSTRACT

An apparatus energized by a flowing fluid includes at least one turbine blade having a trailing edge angle and an elastic deformation member connected to the at least one turbine blade. The deformation of the elastic deformation member changes an orientation of a trailing edge angle of the at least one turbine blade.

17 Claims, 3 Drawing Sheets

(56) References Cited

U.S. PATENT DOCUMENTS

| | | |
|---|---|---|
| 7,083,382 B2 * | 8/2006 | Ursua ............... F03D 3/005 |
| | | 416/110 |
| 7,204,326 B2 | 4/2007 | Downie et al. |
| 7,234,543 B2 | 6/2007 | Schaaf |
| 7,524,160 B2 | 4/2009 | Kolle et al. |
| 8,128,865 B2 * | 3/2012 | Jahnz ............... B22F 3/15 |
| | | 416/186 R |
| 8,267,196 B2 | 9/2012 | Hall et al. |
| 8,496,433 B2 * | 7/2013 | Yan ............... F03D 3/067 |
| | | 416/106 |
| 2005/0211471 A1 | 9/2005 | Zupanick |
| 2008/0095608 A1 | 4/2008 | Boatner |
| 2008/0213083 A1 | 9/2008 | Unno |
| 2010/0183430 A1 | 7/2010 | Winnacker |
| 2012/0217067 A1 | 8/2012 | Mebane, III et al. |
| 2013/0078092 A1 | 3/2013 | Chen et al. |

OTHER PUBLICATIONS

Klassen, J. et al., & "Turbine Technology Innovations May Enhance Operator Ability to Tap Reservoirs Below 15,000 ft".
Younkins, T. D. et al.,"Steam Turbine Overspeed Control and Behavior During System Disturbances,," General Electric Company.

* cited by examiner

FLOW RATE RESPONSIVE TURBINE BLADES AND RELATED METHODS

BACKGROUND OF THE DISCLOSURE

1. Field of the Disclosure

This disclosure relates generally to oilfield downhole tools and more particularly to speed control for turbine drives.

2. Description of the Related Art

To obtain hydrocarbons such as oil and gas, boreholes or wellbores are drilled by rotating a drill bit attached to the bottom of a BHA (also referred to herein as a "Bottom Hole Assembly" or ("BHA"). The BHA is attached to the bottom of a tubing, which is usually either a jointed rigid pipe or a relatively flexible spoolable tubing commonly referred to in the art as "coiled tubing." The string comprising the tubing and the BHA is usually referred to as the "drill string." BHA's, as well as other wellbore devices, may include a turbine drive to generate rotary power. This rotary power may be conveyed to a consumer; e.g., an oil pump or an alternator.

Variations in the operating conditions, which may be intentional or unintentional, can alter the fluid flow used to energize turbine drives. For example, an increase in fluid flow rate can increase turbine rotational speed. Some consumers of rotary power can be damaged when driven at an excessive speed. The present disclosure addresses the need for controlling the speed of turbine drives.

SUMMARY OF THE DISCLOSURE

In one aspect, the present disclosure provides an apparatus energized by a flowing fluid. The apparatus may include at least one turbine blade having a trailing edge angle; and an elastic deformation member connected to the at least one turbine blade. The deformation of the elastic deformation member changes an orientation of a trailing edge angle of the at least one turbine blade.

Another apparatus according to the present disclosure includes a hub; a plurality of turbine blades arrayed around the hub, each turbine blade having a leading edge, a trailing edge, a center of gravity, and a trailing edge angle; a front elastic element including plurality of spokes, each spoke connecting an associated turbine blade to the hub; and a back elastic element including a plurality spokes, each spoke connecting an associated turbine blade to the hub. The front elastic element and the back elastic element deform when the hub rotates. This deformation change the orientation of the trailing edge angle of each the plurality of turbine blades.

Examples of certain features of the disclosure have been summarized in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

As will be appreciated from the discussion below, aspects of the present disclosure may be used to control the rotational speed of turbine drives. The control may include reducing the rate at which speed increases, preventing speeds above a present value, maintaining speed within a specified range, and/or reducing speed when encountering one or more specified condition. Embodiments of the present disclosure may be used with any number of fluid systems in various industries. Merely for brevity, the present teachings will be discussed in connection with devices and tools used in subsurface applications.

Figure 1A:
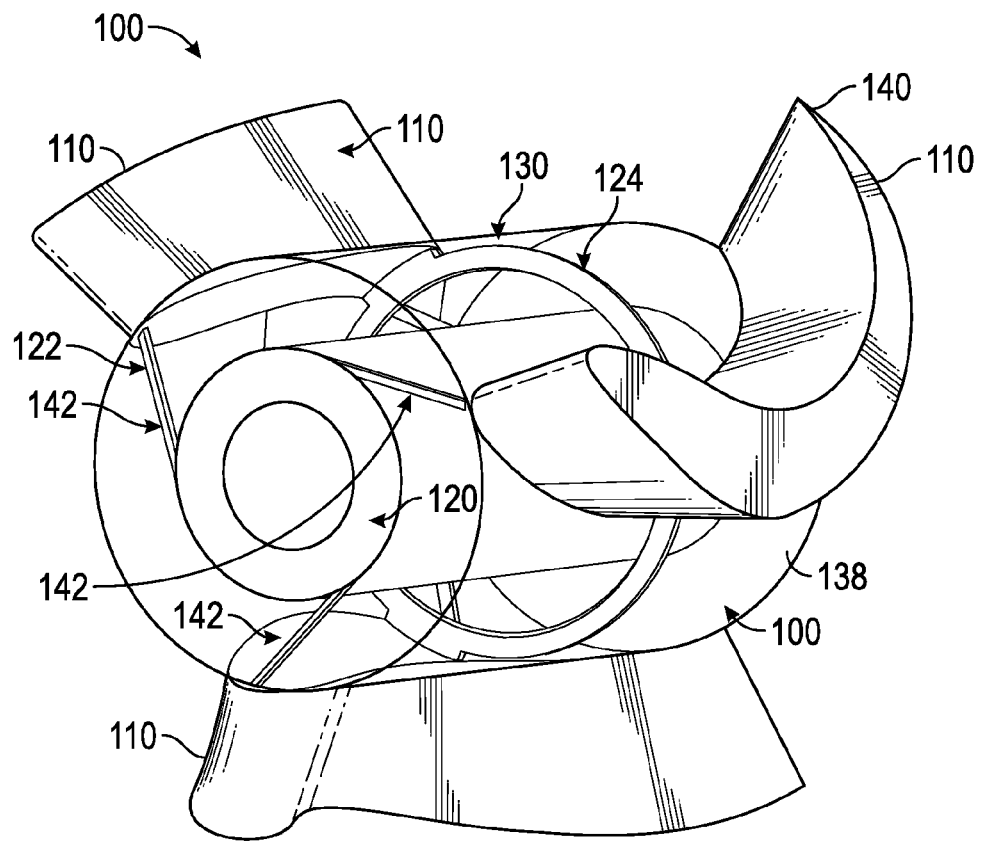
FIG. 1A isometrically illustrates a turbine drive made in accordance with embodiments of the present disclosure.

Referring to FIG. 1A, there is shown one illustrative turbine drive assembly 100 in accordance with the present disclosure. The turbine drive assembly 100 has a plurality of turbine blades 110 that are arrayed around a hub 120. As used herein, the term "blade" or "turbine blade" refers to a vane that is specifically contoured and dimensioned to extract energy from a flowing fluid. As will be discussed in greater detail below, the orientation of the turbine blades 110 can change depending on the rotational speed of the hub 120. In particular, the turbine blades 110 reorient themselves to reduce the "tip speed ratio" when the flow velocity increases. As used herein, the tip speed ratio is the rotational speed divided by the fluid flow rate. In one aspect, the reorientation is passive and does not require external control inputs or externally added energy. Rather, the reorientation of the turbine blades 110 is done using the energy in the flowing fluid.

Figure 1B:
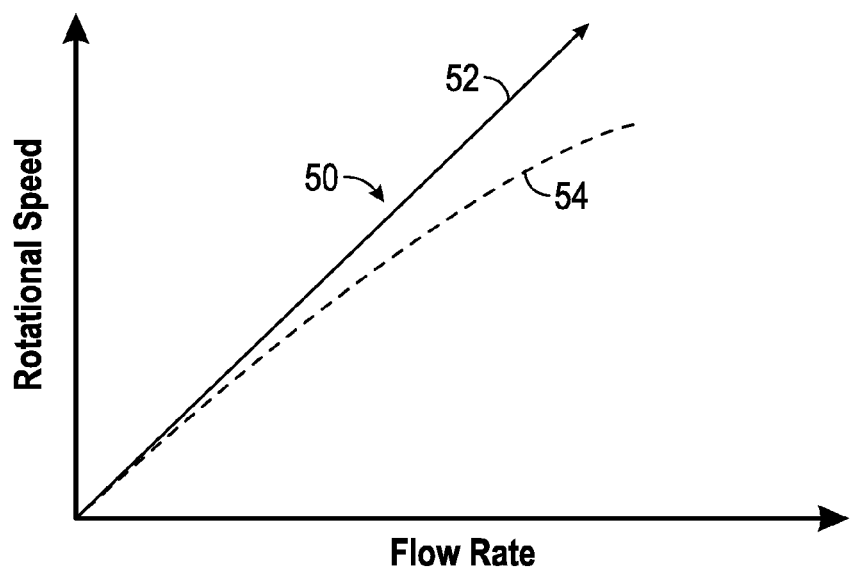
FIG. 1B is a graph showing rotational speed to flow rate relationships.

Referring to FIG. 1B, there is a graph 50 that illustrates the predicted behavior of the turbine drive assembly 100 of FIG. 1B under a "no load" condition. As used herein, a "no load" condition is when the turbine drive assembly 100 is not outputting torque or energy to a consumer. The "x-axis" is the flow rate of the fluid flowing through the turbine drive assembly 100 (FIG. 1A) and the "y-axis" is the rotational speed of the hub 120 (FIG. 1A). Line 52 represents the response of a conventional fixed-blade turbine (not shown) to increased flow rate. It should be noted that line 52 is linear. The inclination of the line 52 is equivalent to the tip speed ratio. Specifically, an increase in flow rate generates a consistent increase in rotational speed. Turbine drive assemblies according to the present disclosure are predicted to have a response similar to that shown by line 54. Line 54 is non-linear. That is, an increase in flow rate does not generate a consistent increase in rotational speed. Rather, the magnitude of the speed increase drops as the flow rate increases. Stated differently, the tip speed ratio decreases.

In embodiment, the turbine drive assembly 100 includes an elastic deformation member 130 that deforms in a predetermined manner when subjected to the centrifugal forces associated with rotation of the blades 110. Exemplary modes of deformation include bending, twisting, stretching, expanding, shrinking, and contracting. Illustrative, but not limiting, examples of suitable materials for the elastic deformation member 130 include spring steel, plastics, elastomerics, and other materials that have a modulus of elasticity providing a suitable elastic deformation range. The material(s), shape, and orientation of the elastic deformation member 130 may be selected to allow a deformation that changes the orientation of an angle of a trailing edge 140 of the blades 110. Changing the orientation of the angle of the trailing edge 140 causes a corresponding change of the tip speed ratio. Additionally, the turbine drive assembly 100 may include other features such as a protective enclosure 138 for protecting the elastic deformation member 130. The protective enclosure 138 may be a sleeve or coating that partially or completely encloses the elastic deformation member 130. Suitable materials for the protective enclosure 138 include polymers, elastomers, and or pliant materials that can function as a barrier for the elastic deformation member 130 against abrasion, corrosion, erosion, while still allowing the elastic deformation member 130 to deform. The elastic deformation member 130 may be one integral structure.

Figure 2:
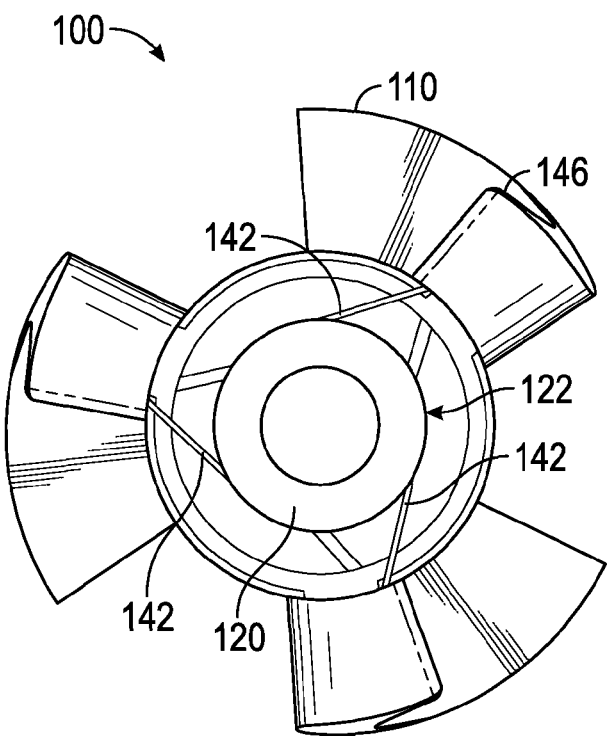
FIG. 2 illustrates a side view of the FIG. 1 embodiment.

Referring to FIG. 2, there is shown an end view of the front elastic element 122 such that fluid flow is "into" the page. The front elastic element 122 includes a plurality of spokes 142. Each spoke 142 connects the blade 110 to the hub 120. It should be noted that the spokes 142 are "bent," i.e., that the spokes do not radiate in a direction that intersects the center of the hub 120. For brevity, the spokes will be referred to as "sloped" or have a tangential component. When encountering fluid flow, the spokes 142 deflect to allow a leading edge 146 of the blade 110 to bend in the counter clock-wise direction.

Figure 3:
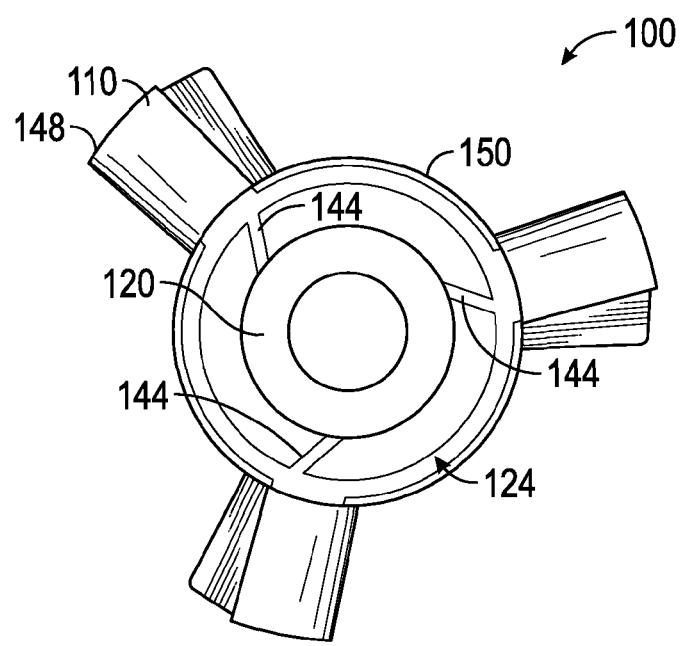
FIG. 3 illustrates a front end view of the FIG. 1 embodiment.

Referring to FIG. 3, there is shown a sectional end view of the back elastic element 124 such that fluid flow is "out of" the page. The back elastic element 124 also includes a plurality of spokes 144. Each spoke 144 connects a blade 110 to the hub 120. It should be noted that the spokes 144 are also sloped. However, the spokes 144 are sloped in a direction opposite to the spokes 142 of the front element 122. When encountering fluid flow, the spokes 144 deflect to allow a trailing edge 148 to bend in the counter clock-wise direction. However, it should be noted that the deflection of the spokes 144 is in the opposite direction of the spokes 142 of the blade 110.

Referring to FIGS. 2 and 3, the spokes 142, 144 may be connected to the hub 120 and blades 110 using various methodologies. For example, the spokes 142 are individually connected to the blades 110. In contrast, the spokes 144 connect to a ring 150 that attaches to the blades 110. Thus, the leading edge 146 may have more freedom of movement as compared to the trailing edge 148. That is, the ring 150 may limit, for example, radial deflection of the trailing edge 148 and maintain the circumferential spacing between the blades 110 at the blade trailing edges 148. The spokes 142, 144 may directly connect to the hub 120 or may connect to a ring or collar (not shown) that attaches to the hub 120. It should be understood that while two elastic elements 122, 124 are shown, the elastic deformation member 130 may include greater or fewer elastic elements. Moreover, the design of the elastic elements 122, 124 are merely illustrative and not limiting. For example, the number, shape, and size of the spokes 142, 144 may be varied.

Figure 4:
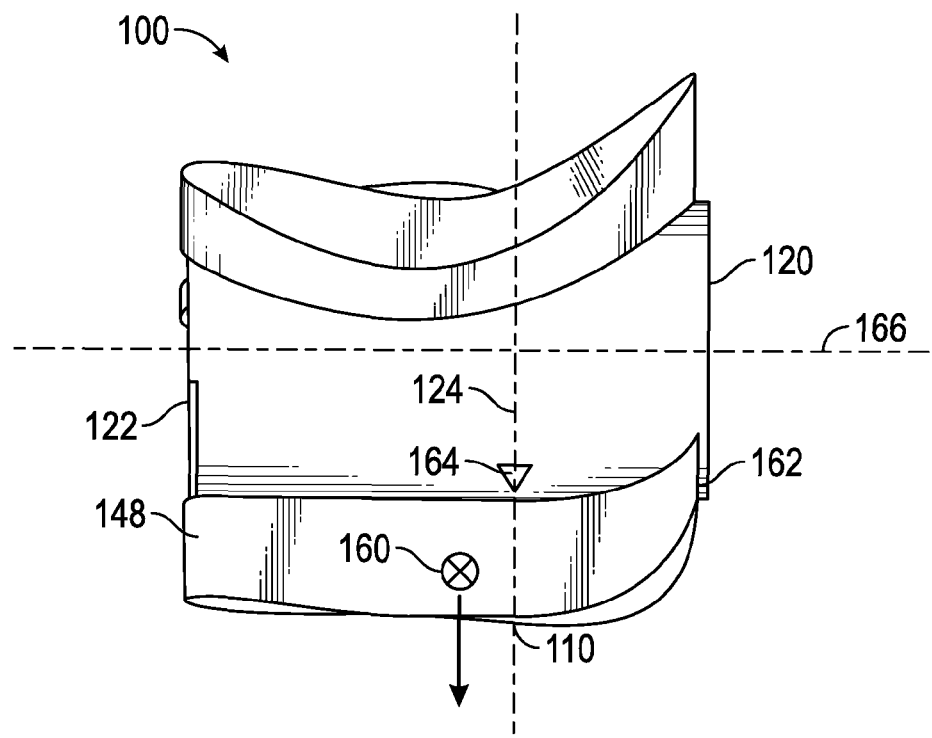
FIG. 4 illustrates a back end view of the FIG. 1 embodiment.

Referring now to FIG. 4, there is shown a side view of the turbine drive assembly 100. The front elastic element 122 is positioned between the leading edge 146 and a center of gravity 160 of the blade 110. The back elastic element 124 is positioned between a trailing edge 162 of the blade 110 and the blade center of gravity 160. Thus, during rotation, the centrifugal force acts on the center of gravity 160 and rotates the blade 110 about the back elastic element 124. Specifically, the blade 110 rotates around an axis 164 that extends through the blade 110. The axis 164 may or may not be orthogonal with or intersect a long axis 166 of rotation of the hub 120. Aligning the slopes of the spokes 142 and 144 in opposing direction allows the blades 110 to rotate about the axis 164. Thus, it should be appreciated that the blades 110 rotate about at least two axes: (i) the long axis 166 of the hub 120 (or "external axis") (rotational axis of turbine speed) and (ii) an axis 164 that extends through the blade 110 (or "internal axis") (axis for a certain angle of deflection).

Figure 5:
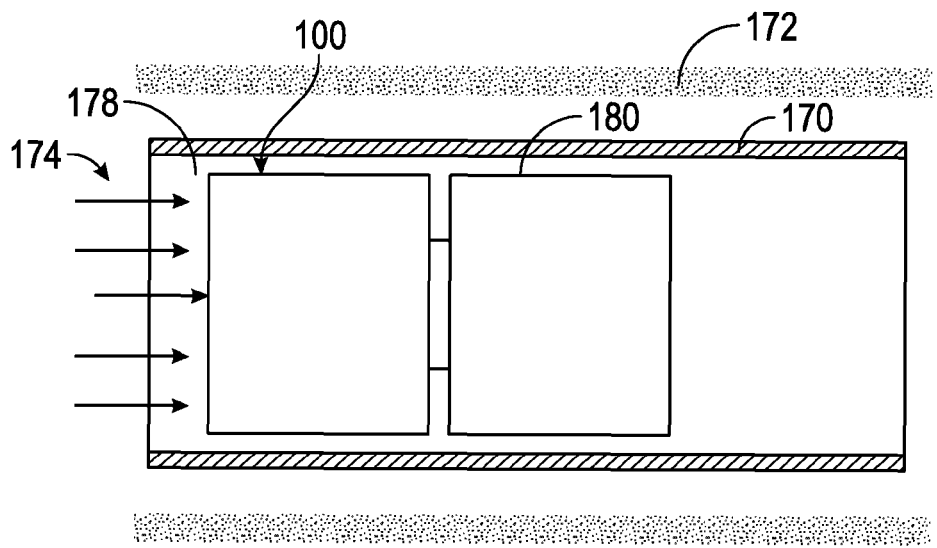
FIG. 5 illustrates a power generation system in accordance with one embodiment of the present disclosure.

The teachings of the present disclosure may be used to adjust or control blade orientation in any number of situations. For example, referring to FIG. 5, embodiments of the present disclosure may be used along a drill string 170 conveyed along a borehole 172 drilled in an earthen formation. The drill string 170 includes a turbine drive 100 according to the present disclosure. The fluid 174 energizing the turbine drive 100 may be a pressurizing drilling mud (a liquid) that is pumped from the surface through a bore 178 of the drill string 170. The turbine drive may be used to drive a rotary power consumer 180, e.g., an alternator that generates electrical power, hydraulic pumps, a shaft that rotates cutting elements, etc.

During operation, the fluid 174 may be pumped at different flow rates. When flow rates increase, the additional flow velocity in the fluid would normally cause the turbine drive 100 to rotate faster. However, the blades 110 (FIG. 2) reduce the tip speed ratio due to the change the trailing edge orientation described above. Thus, the modified geometry caused by centrifugal forces can reduce the magnitude of the speed increase, prevent a speed increase, or reduce rotational speed. Accordingly, the rotary power consumer device is protected damage from being driven at too high of a speed. Additionally, the teachings of the present disclosure may also be used in other applications such as wind turbines or steam turbines. Thus, the energizing fluid may be a liquid (e.g., drilling mud or water), a gas (e.g., steam or air), or a mixture (e.g., an air and fuel).

It should be noted that the teachings of the present disclosure are not limited to the embodiments described above. For example, the turbine drive assemblies according to the present disclosure are not limited to exhibiting a diminished speed response to flow rate increase. The turbine blade assemblies may also be configured to non-linearly increase speed as flow rate increases. That is, the turbine blade assembly increases the tip speed ratio when the flow rate increases. Moreover, the response need not be limited to a non-linear response. For example, the behavior may be similar to a step function where the speed responses change abruptly from a first response to a second response.

While the foregoing disclosure is directed to the one mode embodiments of the disclosure, various modifications will be apparent to those skilled in the art. It is intended that all variations within the scope of the appended claims be embraced by the foregoing disclosure.

What is claimed is:

1. An apparatus energized by a flowing fluid, comprising:
   at least one turbine blade having leading edge and a trailing edge angle, the at least one turbine blade rotating around a first long axis; and
   an elastic deformation member connected to the at least one turbine blade, wherein a deformation of the elastic deformation member rotates the leading edge in a direction opposite to a rotation of the trailing edge, the rotations being about the first long axis and changing an orientation of the trailing edge angle of the at least one turbine blade.

2. The apparatus of claim 1, wherein the at least one turbine blade deforms the elastic deformation member when the at least one turbine blade rotates about an axis that always intersects the at least one turbine blade as the at least one turbine blade rotates around the first long axis.

3. The apparatus of claim 2, wherein a center of gravity of the at least one turbine blade is axially spaced from a connection between the at least one turbine blade and the elastic deformation member, the center of gravity rotating the at least one turbine blade about the axis that always intersects the at least one turbine blade.

4. The apparatus of claim 1, wherein the at least one turbine blade comprises a plurality of turbine blades, and further comprising a ring to which the plurality of turbine blades are connected, wherein the elastic deformation member connects to the ring and the at least one turbine blade rotates about a connection with the elastic deformation member.

5. The apparatus of claim 1, wherein the elastic deformation member include a front elastic element and a back elastic element, each of which separately connects to the at least one turbine blade.

6. The apparatus of claim 5, wherein the at least one turbine blade has a leading edge, a trailing edge, and a center of gravity, wherein the front elastic element is positioned between the leading edge and the center of gravity, and wherein the back elastic element is position between the trailing edge and the center of gravity.

7. The apparatus of claim 6, wherein the at least one turbine blade comprises a plurality of turbine blades, and further comprising a ring to which the plurality of turbine blades are connected, and further comprising a hub, wherein the back elastic element connects at one end to the hub and connects at another end to the ring.

8. An apparatus of claim 7, further comprising an enclosure surrounding the hub and at least partially enclosing the front elastic element and the back elastic element.

9. A method for controlling a speed of a turbine drive assembly energized by a flowing fluid, comprising:
reducing a rate at which a rotational speed of a plurality of turbine blades increases as a flow rate of the flowing fluid increases by reducing a tip speed ratio of the plurality of turbine blades, the tip speed ratio being the rotational speed divided by the flow rate of the flowing fluid, the reduction being done by connecting at least one elastic deformation member to the plurality of turbine blades associated with the turbine drive assembly, wherein a deformation of the at least one elastic deformation member changes an orientation of a trailing edge angle of the at least one turbine blade.

10. The method of claim 9, wherein each of turbine blade of the plurality of turbine blades has a leading edge and a trailing edge, wherein each turbine blade rotates about an axis that always intersects the associated turbine blade.

11. An apparatus energized by a flowing fluid, comprising:
a hub;
a plurality of turbine blades arrayed around the hub, each turbine blade having a leading edge, a trailing edge, a center of gravity, and a trailing edge angle;
a front elastic element including plurality of spokes, each spoke connecting an associated turbine blade to the hub; and
a back elastic element including a plurality spokes, each spoke connecting an associated turbine blade to the hub,
wherein the front elastic element and the back elastic element deform when the hub rotates, and wherein the deformations rotate the leading edges in a direction opposite to a rotation of the trailing edges, the rotations being about a long axis of the hub and changing the orientation of the trailing edge angle of each the plurality of turbine blades.

12. The apparatus of claim 11, wherein each turbine blade has an axis that always intersects the associated turbine blade, wherein each turbine blade deforms an associated elastic deformation member when each turbine blade rotates about the axis that intersects that turbine blade.

13. The apparatus of claim 11, wherein a center of gravity of each turbine blade is axially spaced from a connection between each turbine blade and the front elastic element.

14. The apparatus of claim 11, wherein the at least one turbine blade rotates about a connection with the elastic deformation member.

15. The apparatus of claim 1, wherein the deformation is one of: (i) bending, (ii) twisting, and (iii) stretching, (iv) expanding, (v) shrinking, and (vi) contracting.

16. The apparatus of claim 1, wherein the elastic deformation member connects the at least one turbine blade to a hub, wherein a tip speed ratio is defined as an inclination of a line defining a relationship between a flow rate of a fluid flowing along the at least one turbine blade and a rotation speed of the hub, and wherein the elastic deformation member deforms to reduce the tip speed ratio of the at least one turbine blade as the flow rate increases.

17. The apparatus of claim 11, further comprising a ring to which the plurality of turbine blades connect, and wherein the back elastic element connects the ring to the hub.

* * * * *